(12) United States Patent
Theytaz et al.

(10) Patent No.: US 7,333,083 B1
(45) Date of Patent: Feb. 19, 2008

(54) OPTICAL BASED PERFORMANCE IMPROVEMENT FOR AN OPTICAL ILLUMINATION CONFIGURATION

(75) Inventors: Olivier Theytaz, Savigny (CH); Francis Pilloud, Clarens (CH); Pascal Eichenberger, Lausanne (CH)

(73) Assignee: Logitech Europe S.A., Romanel-sur-Morges (CH)

( * ) Notice: Subject to any disclaimer, the term of this patent is extended or adjusted under 35 U.S.C. 154(b) by 60 days.

(21) Appl. No.: 10/033,427

(22) Filed: Dec. 27, 2001

Related U.S. Application Data

(60) Provisional application No. 60/290,268, filed on May 10, 2001.

(51) Int. Cl.
*G09G 5/00* (2006.01)

(52) U.S. Cl. .............. 345/156; 345/166; 359/837; 359/831

(58) Field of Classification Search ............... 345/156, 345/163, 164, 166, 167; 359/837, 831; 250/221, 250/221.1; 362/618, 326
See application file for complete search history.

(56) References Cited

U.S. PATENT DOCUMENTS

| | | | |
|---|---|---|---|
| 4,521,772 A | 6/1985 | Lyon | |
| 4,521,773 A | 6/1985 | Lyon | |
| 4,751,505 A * | 6/1988 | Williams et al. | 345/166 |
| 4,794,384 A | 12/1988 | Jackson | |
| 4,799,055 A | 1/1989 | Nestler et al. | |
| 4,978,860 A | 12/1990 | Bayley et al. | |
| 5,420,943 A | 5/1995 | Mak | |
| 5,463,387 A | 10/1995 | Kato | |
| 5,578,813 A | 11/1996 | Allen et al. | 250/208.1 |
| 5,644,139 A | 7/1997 | Allen et al. | 250/557 |
| 5,680,157 A | 10/1997 | Bidiville et al. | |
| 5,686,720 A | 11/1997 | Tullis | |
| 5,703,353 A | 12/1997 | Blalock et al. | |
| 5,729,008 A | 3/1998 | Blalock et al. | |
| 5,769,384 A | 6/1998 | Baumgartner et al. | |
| 5,786,804 A | 7/1998 | Gordon | |
| 5,793,032 A | 8/1998 | Bard et al. | |
| 5,793,356 A | 8/1998 | Svancarek et al. | 345/161 |

(Continued)

FOREIGN PATENT DOCUMENTS

EP 1081634 A2 3/2001

(Continued)

OTHER PUBLICATIONS

*Mouse & Keyboard Products, IntelliMouse® Explorer*, [online], © 2004, [retrieved Oct. 22, 2004], 1 page, Retrieved from the Internet:<URL:http://www.microsoft.com/hardware/mouseandkeyboard/productdetai.

(Continued)

*Primary Examiner*—Richard Hjerpe
*Assistant Examiner*—Leonid Shapiro
(74) *Attorney, Agent, or Firm*—Fenwick & West LLP

(57) ABSTRACT

A system, method, and method of manufacturing directed to an optical device with an efficient optical illumination. The optical illumination can be provided by tilting a light source and using a refractive lens to direct the light onto a surface. Alternatively, the optical illumination can be provided using total internal reflection with a conical light pipe and a curvatured entrance and exit surface.

23 Claims, 9 Drawing Sheets

U.S. PATENT DOCUMENTS

| | | | |
|---|---|---|---|
| 5,793,357 A | 8/1998 | Ivey et al. | |
| 5,825,044 A | 10/1998 | Allen et al. | 250/557 |
| 5,940,217 A | 8/1999 | Broome et al. | |
| 5,952,997 A | 9/1999 | Hu | |
| 5,994,710 A | 11/1999 | Knee et al. | |
| 6,002,525 A | 12/1999 | Poulo et al. | |
| 6,021,009 A | 2/2000 | Borodovsky et al. | |
| 6,040,592 A | 3/2000 | McDaniel et al. | |
| 6,040,950 A | 3/2000 | Broome | 359/820 |
| 6,049,338 A | 4/2000 | Anderson et al. | |
| 6,057,540 A | 5/2000 | Gordon et al. | |
| 6,084,574 A * | 7/2000 | Bidiville | 345/166 |
| 6,104,020 A | 8/2000 | Knee et al. | |
| 6,145,746 A | 11/2000 | Bard et al. | |
| 6,151,015 A | 11/2000 | Badyal et al. | |
| 6,175,357 B1 | 1/2001 | Gordon | |
| 6,188,057 B1 | 2/2001 | Misek | |
| 6,233,368 B1 | 5/2001 | Badyal et al. | |
| 6,281,882 B1 | 8/2001 | Gordon et al. | |
| 6,380,927 B1 | 4/2002 | Ostrum et al. | |
| 6,421,045 B1 * | 7/2002 | Venkat et al. | 345/167 |
| 6,426,498 B1 * | 7/2002 | Bohn et al. | 250/234 |
| 6,462,330 B1 | 10/2002 | Venkat et al. | |
| 6,476,970 B1 * | 11/2002 | Smith | 359/618 |
| 6,476,987 B1 * | 11/2002 | Kleinschmidt et al. | 359/837 |
| 6,531,692 B1 * | 3/2003 | Adan et al. | 250/221 |
| 6,538,243 B1 * | 3/2003 | Bohn et al. | 250/208.1 |
| 2002/0080117 A1 * | 6/2002 | Son et al. | 345/163 |

FOREIGN PATENT DOCUMENTS

| | | |
|---|---|---|
| EP | 1182606 A2 | 2/2002 |
| EP | 1283493 A2 | 2/2003 |
| KR | 1020010016506 A | 3/2001 |
| WO | WO 99/39304 | 8/1999 |
| WO | WO99/39304 | 8/1999 |
| WO | WO 00/33245 | 6/2000 |
| WO | WO 00/38103 | 6/2000 |
| WO | WO 00/57352 | 9/2000 |

OTHER PUBLICATIONS

*Mouse & Keyboard Products, Trackball Optical*, [online], © 2004, [retrieved Oct. 22, 2004], 2 pages, Retrieved from the Internet:<URL:http://www.microsoft.com/hardware/mouseandkeyboard/productdetai.

*Mouse & Keyboard Products, Microsoft Optical Technology*, [online], © 2004, [retrieved Oct. 22, 2004], 2 pages, Retrieved from the Internet:<URL:http://www.microsoft.com/hardware/mouseandkeyboard/technologies.

Bortz, J., Shatz, N., Pitou, D., "Optimal Design of a Nonimaging Projection Lens for Use With an LED Source and a Rectangular Target", Proceedings of SPIE, vol. 4092, 2000.

German Office Action for Application No. 102 20 890.5-53, Jun. 15, 2007, 4 pages.

* cited by examiner

OPTICAL BASED PERFORMANCE IMPROVEMENT FOR AN OPTICAL ILLUMINATION CONFIGURATION

CROSS REFERENCE TO RELATED APPLICATIONS

The present application claims priority from provisional U.S. Patent Application Ser. No. 60/290,268, for "An Optical Illumination System and Method," filed May 10, 2001, the disclosure of which is incorporated herein by reference.

BACKGROUND

A. Technical Field

The present invention relates generally to optical technology, and more particularly, to optical technology in an input device.

B. Background

Optical technology is used in many contexts, including in optical input devices. There are many different types of input devices, including a mouse, a trackball, and a joystick. There are significant advantages to using optical input devices over mechanical and opto-mechanical input devices. For example, mechanical or opto-mechanical input devices have mechanical components that are more susceptible to breakdown or wear out. Optical devices having only solid state components are less susceptible to such breakdown or wear out. However, one disadvantage of some optical input devices is increased power consumption, caused in part by an inefficient illumination source or system. Illumination requires a precise angle of illumination and a sufficient optical power to create a pattern on a surface (e.g., a table surface) that can then be captured by a photosensor. The pattern is the surface pattern itself illuminated by the beam or the light and shadow of the surface microstructure that is generated by the illumination beam impinging at the appropriate angle. In conventional illumination systems, in order to achieve the desired illumination at the desired angle and the desired optical power, large power consumption is required due to an inefficient illumination system. This power consumption shortens battery life in wireless, optical pointing device systems.

As an example of an optical displacement system, consider an optical mouse. The optical mouse includes a conventional illumination system. Conventional illumination systems consist of a light emitting diode (LED) and a double prism system. The double prism system consists of an entrance surface, a double prism, and three exiting facets approximating a cylindrical concave exit surface. The entrance surface is a plano-convex lens shape linked to the double prism body that collects the LED light and collimates it. The double prism conducts the light beam to a target area on the table surface with the required incidence angle. The cylindrical concave exit surface attempts to spread the light evenly on the target area. An imaging lens creates an image of the lighted area on an optical sensor. The double prism system serves as a light conductor between the LED and the table surface (e.g. a table top or mousepad). Conventional illumination systems require that a total internal reflection (TIR) condition be met. A TIR condition is met when an incidence angle of a light ray, for example, inside a plastic media interfaced with air, is larger than a critical angle resulting in total internal reflection at the transparent material surface and no rays are refracted outside the transparent material. However, rays that do not encounter the entrance surface or rays that do not satisfy the TIR condition within the double prism path are lost. In conventional illumination systems, the LED is mounted on a printed circuit board (PCB) in a horizontal configuration on the component side of the PCB. In this conventional configuration, the LED can be easily soldered to the PCB simultaneously with the other electronic components. Thus, to direct the light to the target surface, the double prism is required to achieve both the vertical distance and the required incidence angle.

Conventional illumination systems, using a double prism system, have a long light path, multiple direction changes, and no way to recover diverging rays, thus, increasing loss and reducing efficiency. Furthermore, as the light source, which includes an LED die and LED optics, size is not a single point, it is not possible to accurately focus all rays coming from the LED. There is a significant amount of loss across this conventional system. Examples of four types of loss are: TIR loss, reflection/refraction loss, transmission loss, and coupling efficiency loss. Coupling efficiency loss is caused by the fact that not all light from the LED can get into the double prism because the alignment of the LED with the entrance surface of the prism cannot be perfect and the surface of the entrance lens of the prism is not large enough to collect all the viewing angle emitted by the LED. Each of many intermediate parts contribute to this misalignment, for example, an LED package, an LED support, the PCB, and a mouse case. Due to the above mentioned limitations, the intensity, the uniformity, and the position of the illumination spot are degraded.

Therefore, there is a need for improving the illumination of an optical input device while improving the image signal power on a photosensor. Accordingly, it is also desirable to provide an optical input device with an efficient illumination source that helps reduce power consumption and increase battery life and illuminate the target area uniformly.

SUMMARY OF THE INVENTION

The present invention provides an efficient illumination system. The illumination system can be used in optical input devices, for example, an optical mouse. The present invention includes an optical system that has a conical light pipe with a curvatured (e.g. toroidal) entrance or exit surface (or "window") in one embodiment and a refractive illumination lens in another embodiment. For ease of discussion the term "or" as used herein means both inclusive or and exclusive or, i.e., and/or.

In one embodiment, a refractive lens is used with a tilted light source. The light source can be a light emitting diode (LED) in the visible or near infrared spectrums. The light source can emit light at any one or multiple wavelengths. In alternative embodiments, refractive surfaces of the refractive lens can be replaced with a Fresnel surface or a diffractive optical element (DOE) surface. For ease of discussion, the present invention will be discussed with regard to a lens system that may comprise any one of the above optical surfaces or any combination of the above optical surfaces. It is understood that a refractive lens shall be used to refer to a lens that is either a refractive lens, a Fresnel surface, a diffractive optical element (DOE), or any combination of these lens types.

The light source can be angled relative to the printed circuit board. In one embodiment, there is an opening in the printed circuit board for the light source to protrude through. In another embodiment, the light source is mounted on a separate PCB. The lens system directs the light emitted from the light source to a target area on a surface, e.g., a tabletop or other surface. Typically, the PCB is parallel to the table surface. The table surface can be planar or curvatured, for example, in the case of an optical trackball the surface is a curvatured surface. In one embodiment, the light source is configured to be approximately parallel to the printed circuit board. In this embodiment, a conical light pipe with a curvatured entrance surface or exit surface can be formed to direct the light emitted from the light source to the target area on the table surface. It is understood that a curvatured surface shall be used to refer to a surface with a toroidal shape, a spherical shape, an aspherical shape, a cylindrical shape, or a spline shape. The illuminated target area size is linked to the table surface seen by the sensor through any imaging lens plus safety margins for tolerances.

There are many benefits and advantages of the present invention. One advantage is that less LED current is required for a higher optical power on the table surface due to an illumination yield gain. This helps to prolong battery life for a wireless product. Another advantage is removing a need for a high efficiency LED to compensate for an inefficient lighting system. This helps reduce costs because a less efficient light source may be used. Another advantage is reducing mechanical dimensions for the system thereby increasing design flexibility and reducing cost. For example, there is a significant reduction in the size of the optical portion of an illumination system. The reduction in size permits a smaller lens part to be used, which uses less optical material in manufacturing, less injection time and a smaller mold, and therefore, reduces the cost. Another advantage is that the illumination area position robustness with respect to the target area is increased. Another advantage could be an increase in depth of field because a smaller aperture can be used with the imaging lens. An increase in depth of field allows for greater mechanical tolerances. Another advantage is a reduction in exposition time, the sensor being illuminated with the required amount of energy in a shorter amount of time. The time reduction factor is equivalent to the illumination yield gain.

In one embodiment of the present invention, a refractive illumination lens is used. It is noted that this embodiment of the present invention provides an overall lighting system that is refractive only, meaning that TIR, which causes additional losses, is not used. In this embodiment, the optical system length is reduced significantly by using a tilted LED that is interfaced with a refractive lens instead of a double prism or a light pipe. In this embodiment, the LED can be tilted and moved closer to the target area. In one embodiment, the LED is tilted such that it is not parallel to the PCB, for example placing the LED at a 20 degree to 30 degree angle to the PCB. The LED can be positioned such that it protrudes down through the PCB. In one embodiment, the refractive lens has a curvatured entrance surface and a curvatured exit surface.

In one embodiment of the present invention, losses in the system are reduced by the illumination light pipe, thus making it more efficient. The losses are reduced by the light pipe with a conical shape that reduces the region or surfaces where rays are not under the TIR condition. In one embodiment, instead of using a double prism, a conical (or cylindrical) light pipe is used. The conical light pipe has a larger entrance surface than exit surface. The large entrance surface combined with the light pipe function allows larger position errors for the LED. In one embodiment, a curvatured (e.g. toroidal) entrance surface or exit surface is used. The toroidal shape means that the entrance surface or exit surface has at least two different radii of curvature orthogonal to each other, in a vertical and a horizontal plane. One embodiment has a curvatured surface at each end of the conical light pipe portion. The conical section can be truncated by a first reflective surface. This truncation is advantageous because it allows the LED to be positioned horizontally or obtains the required angle of incidence beam on the target surface. In another embodiment, a second reflective surface also acts to further direct the light toward the surface. The second truncation allows other positions of the LED and further increases design flexibility. In one embodiment, the reflective surfaces combined with the light pipe direct most of the light out the exit surface, forming a twice-truncated cone. In one embodiment the reflective surfaces can be coated with a metallic covering to guarantee reflection of rays not satisfying the TIR condition. In an alternate embodiment, the first reflective surface and the second reflective surface can be removed when the LED is positioned at a predetermined angle.

In one embodiment, an illumination efficiency gain of at least two is realized over a conventional illumination system by using, for example, a conical light pipe truncated by two reflective planes. This gain means two times less current in the LED or half as much power needed for the same illumination. For embodiments with the tilted LED, the efficiency of the illumination system may increase to a factor of at least three. The length reduction of the complete lens system can be about 10 millimeters (mm).

As described above, the benefits of the present invention include an improved battery life, for example for an optical cordless mouse, due to reduced power consumption and component efficiency gains. An efficient or powerful light source is not required with the present invention due to increased efficiency in the illumination system. One embodiment of the present invention reduces the length of the optical system, which enables greater industrial design flexibility. Using the present invention allows for the possibility of gaining depth of field by reducing the imaging lens aperture because there is more energy on the surface. The present invention provides a much more robust system to the misalignment between the light source and the illumination lens by providing enough energy on the surface. The present invention allows a reduction of the exposure time of the sensor if the conventional (high efficiency) light source and the driving current are kept the same. The present invention aims at illuminating the surface with a spot that is more uniform.

As can be seen from the above description, the present invention may be applied to many different domains, and is not limited to any one application. Many techniques of the present invention may be applied to illumination in a number of optical displacement detection systems.

DETAILED DESCRIPTION OF THE INVENTION

The following description of the present invention is presented in the context of an optical illumination for optical displacement detection system for use in, for example, a computer input device. In some embodiments, the principles disclosed may be implemented for use in an optical mouse or an optical trackball. One skilled in the art will recognize that the present invention may be implemented in many other domains and environments, both within the context of optical illumination for optical displacement detection, and in other contexts. Different embodiments of the present invention are now described with reference to the figures where like reference numbers indicate identical or functionally similar elements. Also in the figures, the left most digit of each reference number corresponds to the figure in which the reference number is first used.

Accordingly, the following description, while intended to be illustrative of a particular implementation, is not intended to limit the scope of the present invention or its applicability to other domains and environments. Rather, the scope of the present invention is limited and defined solely by the claims.

Figure 1A:
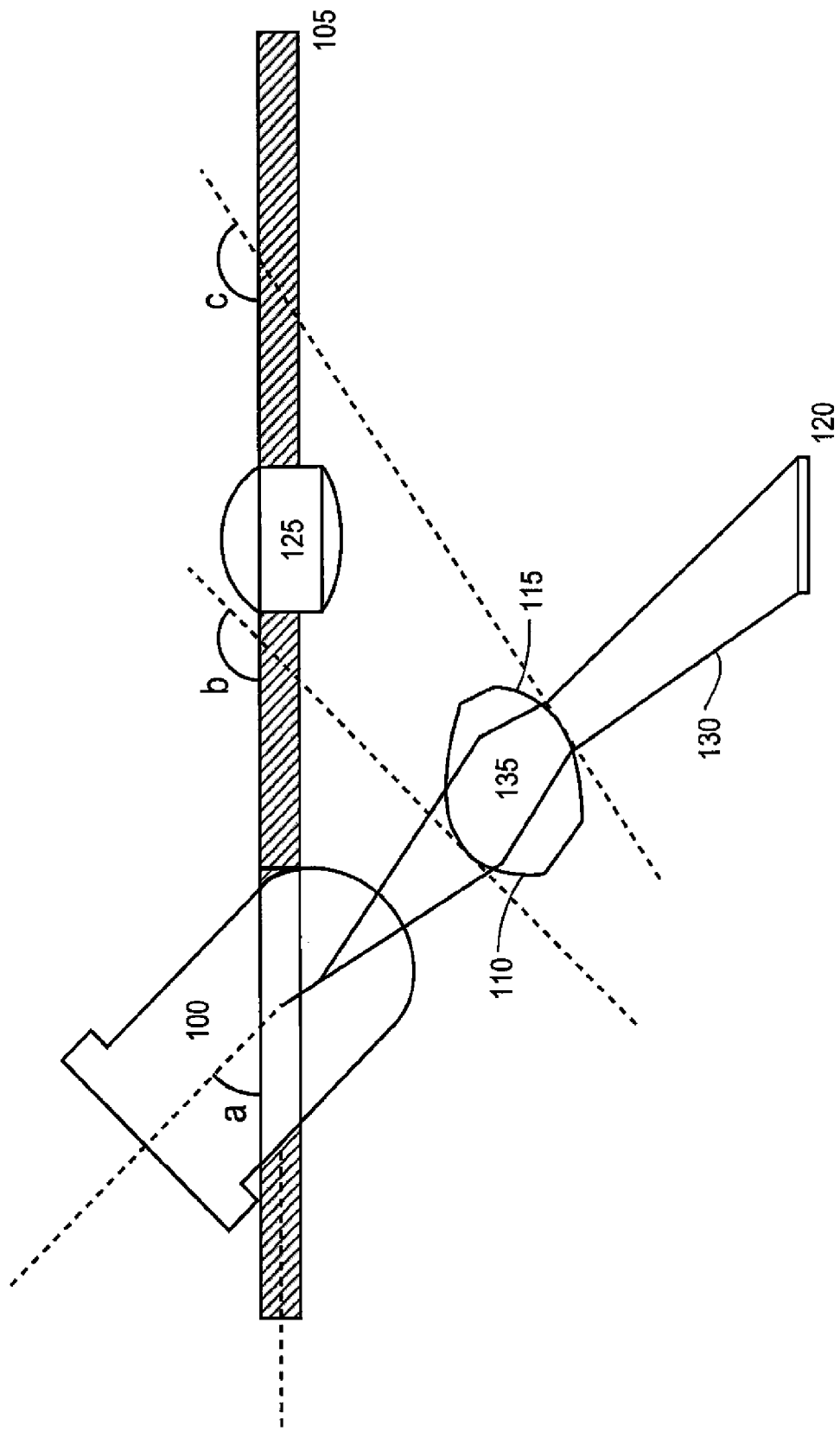
FIGS. 1A and 1B are an illustration of a side view of one embodiment of the present invention that includes a refractive illumination lens with a plane, cylindrical, spherical, aspherical, or toroidal entrance surface or exit surface.

Now referring to FIG. 1A, there is shown a side view of one embodiment of an optical lens system of the present invention that includes a refractive illumination lens. It is understood that the refractive illumination system (e.g., with a flat, cylindrical, spherical, aspherical, or toroidal entrance or exit surface, or window) is also referred to as a lens 135. FIG. 1A shows a light source 100, the lens 135 having an entrance surface 110 and an exit surface 115, a printed circuit board 105, a target area (or a concentration spot) 120 on a surface and an imaging lens 125. In one embodiment, the light source 100 may protrude through an opening in the printed circuit board ("PCB") 105. Further, as is shown, the light source 100 is at a first angle, a, relative to the printed circuit board 105. Light emitted from the light source 100 enters the lens 135 through the entrance surface 110. The light exiting the exit surface 115 of the lens 135 forms a light beam 130 and is directed to a surface at the target area 120. The target area 120 is in line with imaging lens 125. The surface can be any surface, for example, a tabletop or surface, a mouse pad, a paper, or any other surface. For each discussion the application will refer to a table surface as a generic representation of all surfaces, including a ball surface for a trackball.

In an alternative embodiment, the light source 100 does not protrude through the PCB 105. In that embodiment, there is an opening in the PCB 105 for the light emitted from the light source 100 to go through the PCB 105. In one embodiment, the lens 135 protrudes through the PCB 105.

The entrance surface 110 of the lens 135 is curvatured. In one embodiment, the entrance surface 110 can be aspherical in shape to collect as much light as possible. In another embodiment, the entrance surface 110 of the illumination lens 135 can be matched with a shape of the LED tip so that a continuous media without changes of refractive index will result. The exit surface 115 bends the light such that it has the desired angle and focuses the light to produce an illumination spot on the target area that is as uniform as possible on the surface. In one embodiment, the exit surface or the entrance surface can be ground to diffuse the light making it more uniform on the target area 120. The LED die has a contact point in the center causing a hole in the illumination and a ground entrance 110 or exit surface 115 can avoid imaging the die on the surface in some embodiments.

The entrance surface 110 is closest to the light source 100. The entrance surface 110 can be symmetrical about the optical axis of the LED or it can be shifted by design. The entrance surface 110 can be used to collect the light. The exit surface 115 is also a curvatured surface and can be configured to shape the light beam to compensate for elongation resulting from the oblique angle of the beam. Since the beam hits the target area at an angle, the corresponding dimension will be increased, resulting in a light spot with a width and a height that are approximately the same.

The entrance surface 110 of the lens 135 may be, for example, a spherical surface a cylindrical surface, a toroidal surface, or an aspherical surface and may be refractive, Fresnel, or DOE. Similarly, the exit surface 115 of the lens 135 also may be, for example, spherical, cylindrical, toroidal, or aspherical and may be refractive, Fresnel or DOE. The entrance surface 110 and the exit surface 115 each refract light. By adjusting the shape of both or either the entrance surface 110 or the exit surface 115, the light beam emerging from the lens 135 can be shaped or tilted as needed. It is noted, and as shown in FIG. 1A, the entrance surface 110 is angled at a second angle, b, relative to the printed circuit board 105 and the exit surface 115 is angled at a third angle, c, relative to the printed circuit board. 105. As an example, if one surface is cylindrical, it will affect one dimension of the light beam from the light source 100. If the one surface is spherical, it will affect both dimensions of the light beam from the light source 100 the same way. If one surface is toroidal, it will affect two dimensions of the light beam from the light source 100, but in a different way. The entrance and exit surfaces 110 and 115 can be parallel (in the sense of two plano-convex lenses linked together by their flat surfaces) or angled (a prism of wedge being added between the two flat surfaces). In the aligned configuration, the entrance and the exit beams axis will be the same. In the angled configuration, the beam axis will be folded.

In one embodiment of the present invention, a refractive lens 135 is used. In one embodiment, the entrance surface 110 is an aspherical shape and the exit surface 115 is a cylindrical shape. The aspherical entrance surface gathers and focuses the light. The cylindrical exit surface spreads the light evenly on the target area 120.

In one embodiment, the light source 100 of the present invention can be a light emitting diode (LED) emitting at approximately 630 nm. In another embodiment, the light source 100 can be any other light source at any wavelength in the visible spectrum or near the infrared spectrum. The light source can emit light at any one or multiple wavelengths. The lens 135 can be made of many materials including any optical polymer or glass. Some examples of materials that can be used for the lens 135 are polycarbonate, polystyrene, acrylic, polymethylmethacrylate, or another optical plastic. In all embodiments, any material can be used such that the desired result of gathering and focusing light can be achieved.

A benefit of embodiments of the present invention using the lens 135 is that they do not require the use of total internal reflection. By not using total internal reflection to direct the light to the table surface, the system is more robust because there are fewer critical surfaces, which result in fewer errors or misalignments. Further, an optical path for light can be significantly shorter than in lens systems that use total internal reflection, which also allows for potentially fewer chances of encountering flaws. The present invention prevents compounding light transmission errors that may exist when a precise angle between the light source 100 and the entrance surface 110 of the lens 135 is not properly set.

Typically, a lens is close to the light source and symmetrical with an axis of symmetry of the light source. In an implementation that relies on total internal reflection, the lens is sensitive to small variations in alignment between the light source and the lens. However, some embodiments of the present invention do not rely on total internal reflection, including the embodiment shown in FIG. 1, and therefore, are not as sensitive to misalignment between the light source and the lens.

Figure 1B:
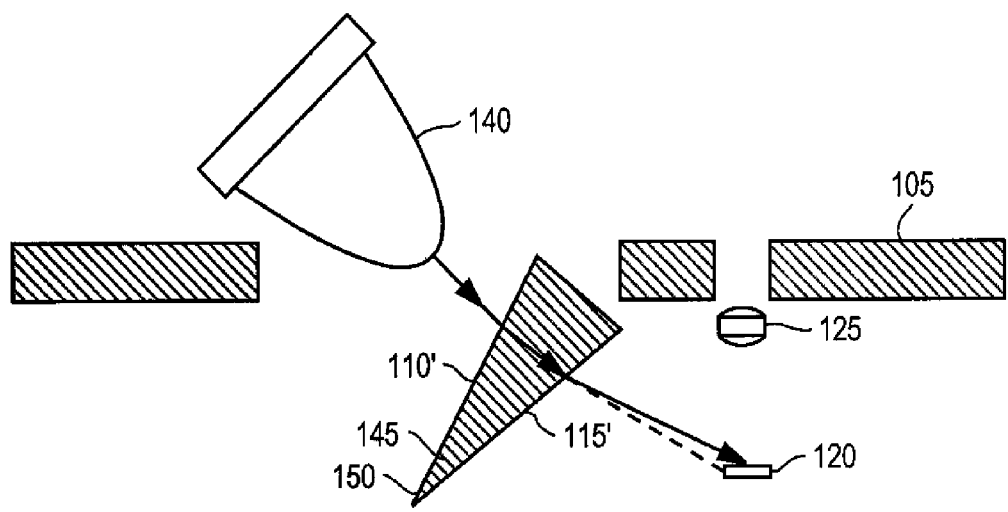

Now referring to FIG. 1B, there is shown another embodiment of a side view of the present invention. FIG. 1B shows another light source 140, a printed circuit board 105, a wedge-shaped refractive lens 145, a target area 120, and an imaging lens 125. The embodiment shown uses a light source 140 with a narrow viewing angle. For example, the viewing angle can be 15 degrees or less. Typically, the LED viewing angle is approximately 30 degrees.

In this embodiment, since the light source has a narrow beam it is not necessary to concentrate the beam and planar entrance or exit surfaces can be used. The wedge-shaped lens 145 functions to fold the light beam so that it reaches the target area at the desired angle. When the light source 140 with a narrow viewing angle is used, the entrance surface 110' may be flat. The lens 135 (shown in FIG. 1A) can be replaced with wedge-shaped lens 145. The wedge-shaped lens 145 bends a light beam axis so that it hits a target area 120 at a required angle. The target area is in line with an imaging lens 125. With a highly directive light source, an entrance surface 110' of the wedge-shaped lens 145 is simplified, although a cylindrical or toroidal exit surface 115' may be used to shape the light beam into a thin, but wide, shape. The angle 150 pointing away from the PCB 105 can be any angle necessary to achieve the desired deviation angle and avoids the TIR condition. For example, the angle 150 can be between 5 degrees and 35 degrees. For an LED with a typical viewing angle of 30 degrees, the wedge 135 can have an entrance or an exit surface that is curvatured, a combination of FIGS. 1A and 1B. Either the entrance surface 110' or exit surface 115' can be partially or totally ground.

Figure 2:
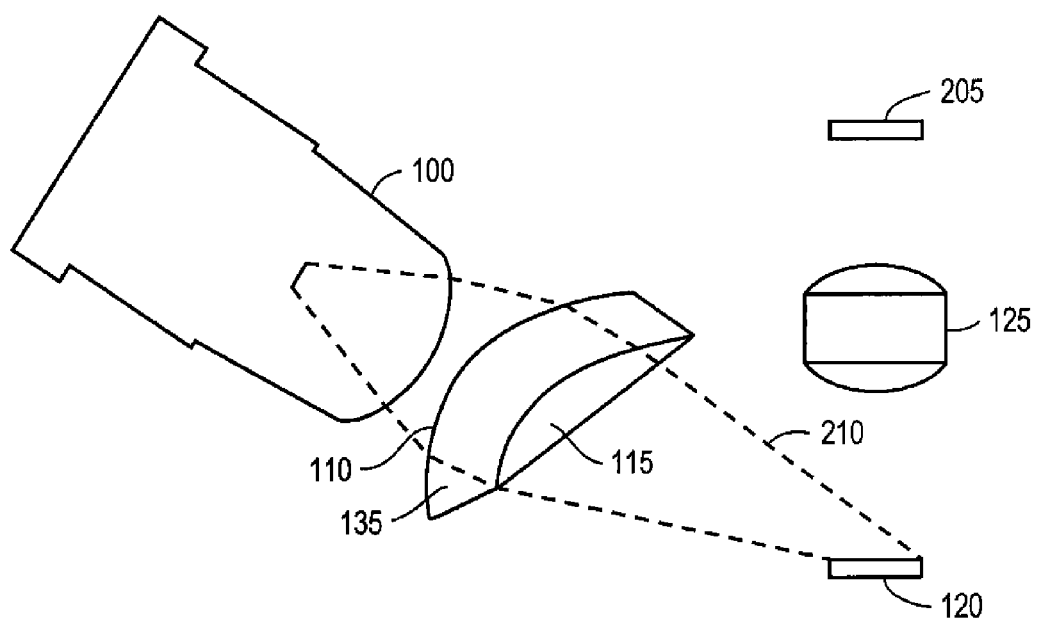
FIG. 2 is an illustration of a second side view of one embodiment of the present invention that includes the refractive illumination lens, LED, target area, imaging lens, and sensor only.

Now referring to FIG. 2, there is shown a side view of one embodiment of the present invention, including the lens 135 with entrance surface 110 and exit surface 115. FIG. 2 shows the light source 100, the lens 135, including the entrance surface 110 and the exit surface 115, the target area 120, the imaging lens 125, and a sensor die surface 205. In one embodiment, the light source 100 shown is an LED. In one embodiment, the LED is at an angle A relative to an upper surface of the PCB (not shown). Similarly to FIG. 1, light emitted from the a LED, enters lens 135. In one embodiment, the entrance surface 110 gathers and refracts the light emitted from the LED 100. In one embodiment, the exit surface 115 refracts the light gathered by entrance surface 110 and spreads the light. The light is focused onto the table surface where the target area 120 is located. The imaging lens forms an image of the table surface where the target area 120 is located. The pattern on the table surface or the pattern of the microstructure of the surface is imaged by the imaging lens 125 on the sensor surface 205.

Figure 3A:
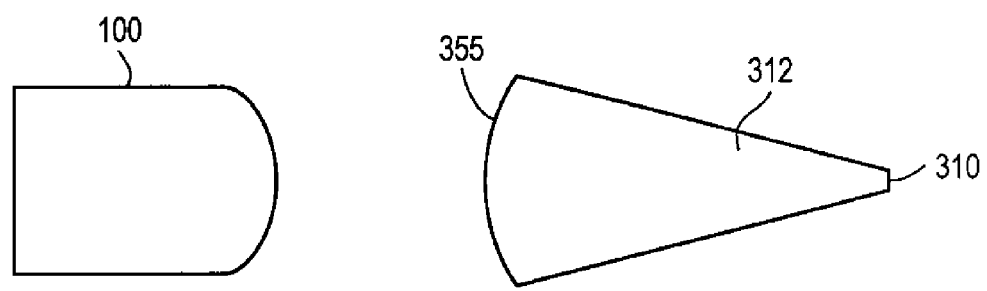
FIGS. 3A, 3B, and 3C are an illustration of the construction method of a conical light pipe that includes zero, one, and two truncating planes.

Now referring to FIG. 3A, there is shown a side view of a conical light pipe. FIG. 3A shows a light source 100 and a conical light pipe 312. The conical light pipe has an entrance surface 355 or exit surface 310. The entrance surface 355 or exit surface 310 can be a curvatured surface. The conical light pipe is larger at the entrance than the exit. The conical light pipe 312 shown is not truncated at all.

Figure 3B:
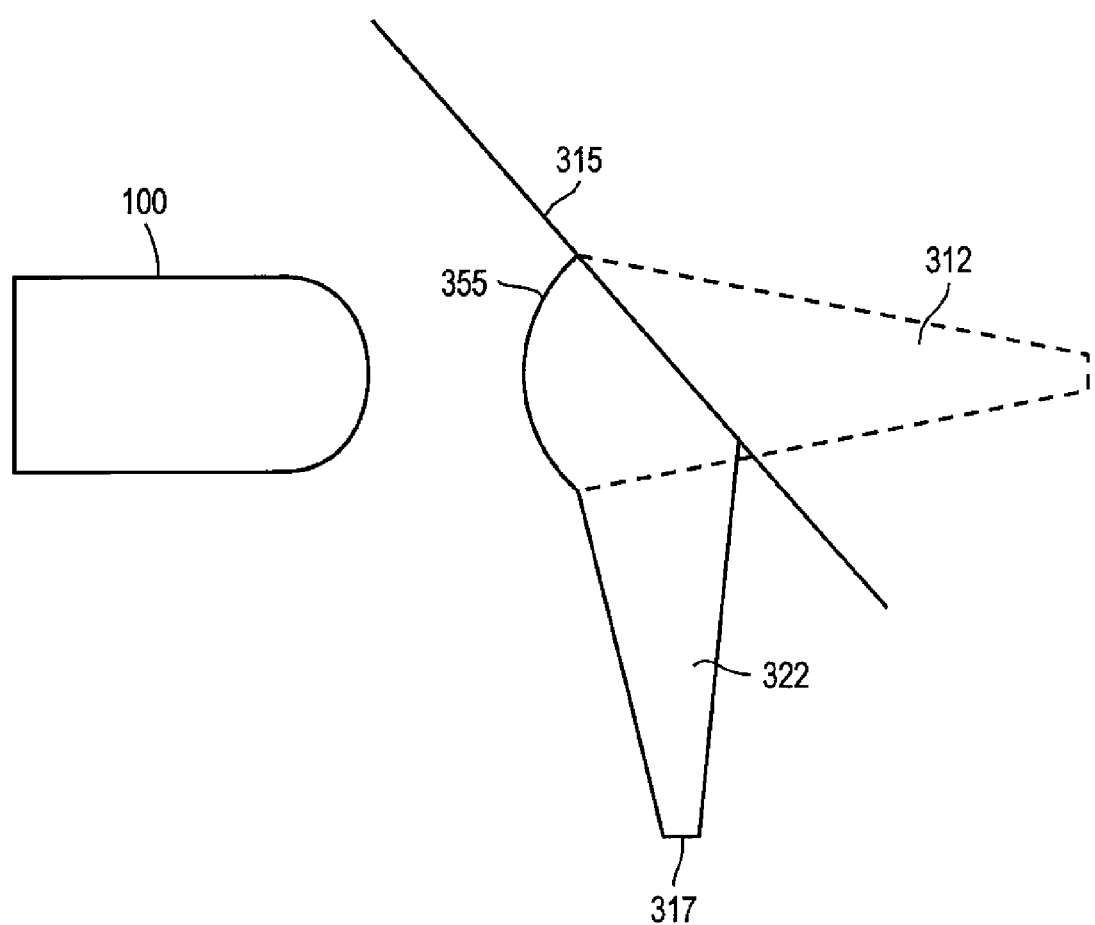

Now referring to FIG. 3B, there is shown a side view of the conical light pipe shown in FIG. 3A with a single truncation plane. FIG. 3B shows the light source 100, the entrance surface 355, an outline of conical light pipe 312, first truncation plane 315, and a second conical light pipe section 322. The first truncation plane is such that the TIR condition is satisfied. In one embodiment, if the TIR condition is not met for most of the contributing rays, the truncation plane can be covered with a metallic surface. For example, the incidence cone axis is between approximately 32 degrees and 90 degrees. The first truncation plane 315 is such that the rays inside the cone 312 are folded, respecting the TIR condition. When the rays encounter truncation plane 315, they are reflected and continue in the conic section 322 until exit surface 317. Conic section 322 is the mirrored image of conic section 312 that is removed by the truncation.

Figure 3C:
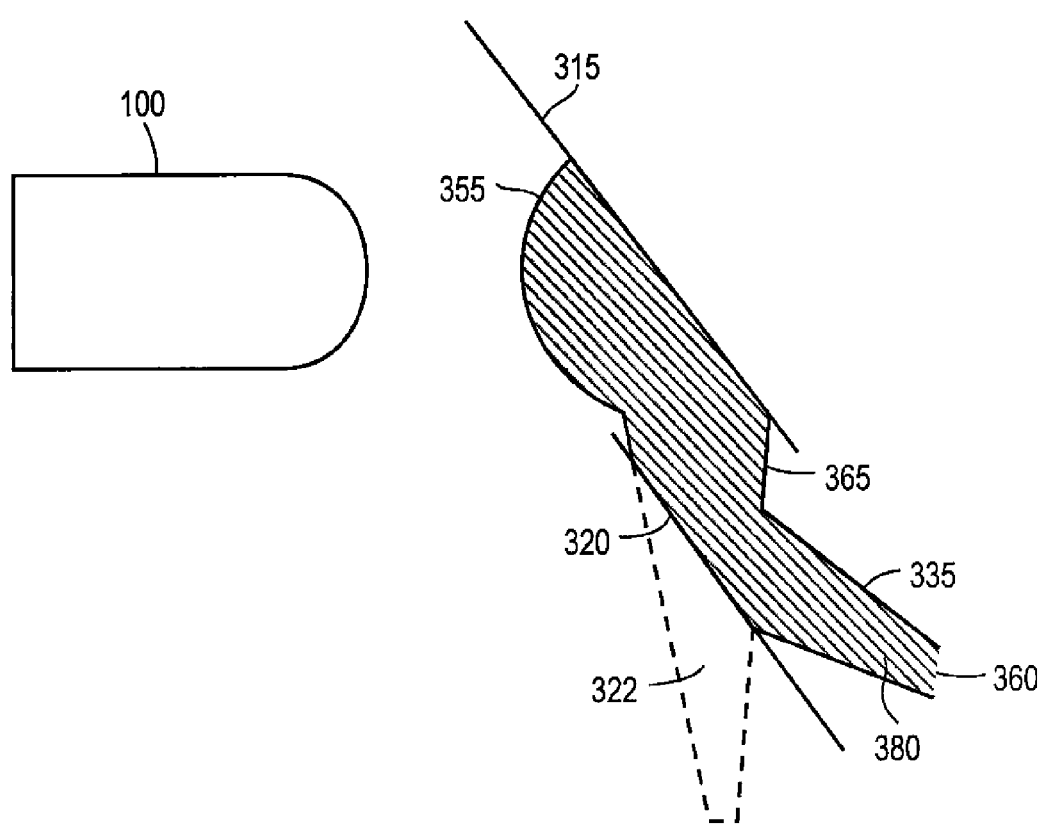

Now referring to FIG. 3C, there is shown a side view of the single truncated conical light pipe shown in FIG. 3B with a second truncation plane added. FIG. 3C shows the light source 100, the entrance surface 355, an outline of the once truncated conical light pipe 322, the first truncation plane 315, a second truncation place 320, and a third conical light pipe section 380. The resulting twice truncated conical light pipe is shown with hatch marks. The second truncation plane can be at an angle such that the TIR condition is satisfied, forming cone 380. In one embodiment, the second truncation plane could also be covered with a metallic coating.

In one embodiment of the present invention, no truncation plane is used, as discussed above in reference to FIGS. 1 and 2. In another embodiment, one truncation plane is used, as discussed below in reference to FIG. 4. In a third embodiment, two truncation planes are used, as discussed below in reference to FIGS. 5 and 6. In the embodiments using zero, one, or two truncation planes a conical light pipe can be used. In the embodiments using zero, one or two truncation planes a cylindrical light pipe can be used instead of the conical light pipe.

In one embodiment, the second truncation plane could be angled such that conic section 360 points to the left instead of the to the right. The light pipe shown in FIG. 3C forms a "Z" shape. However, the light pipe could also be formed to for a "C" or a "U" shape. In these embodiments, the axis of the different conical sections are all in the same plane. Other embodiments are also possible.

Figure 4:
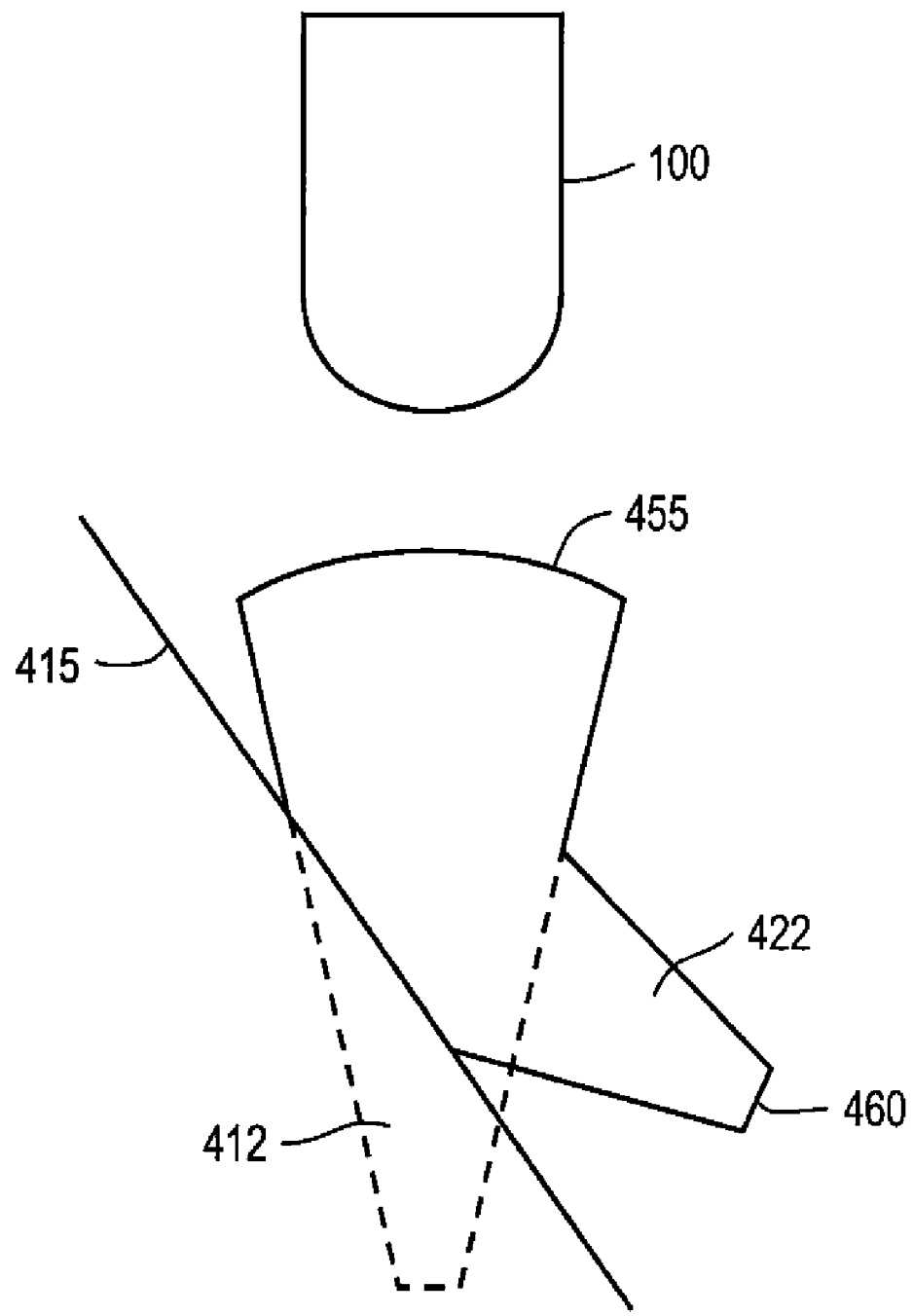
FIG. 4 is an illustration of a side view of one embodiment of the present invention that includes a conical light pipe with a single truncation plane.

Now referring to FIG. 4, there is shown a side view of one embodiment of the present invention including a once truncated conical light pipe. It is understood that in any of the Figs. or description of a conical light pipe, a cylindrical light pipe could be implemented in place of the conical light pipe. FIG. 4 shows a light source 100, an entrance surface 455, a truncation plane 415, an outline of a conical light pipe 412, a once truncated cone 422, and an exit surface 460. In this embodiment, the light source 100 is at an angle approximately vertical, such that the first truncation plane can reflect the light to a target area on a table surface.

Figure 5:
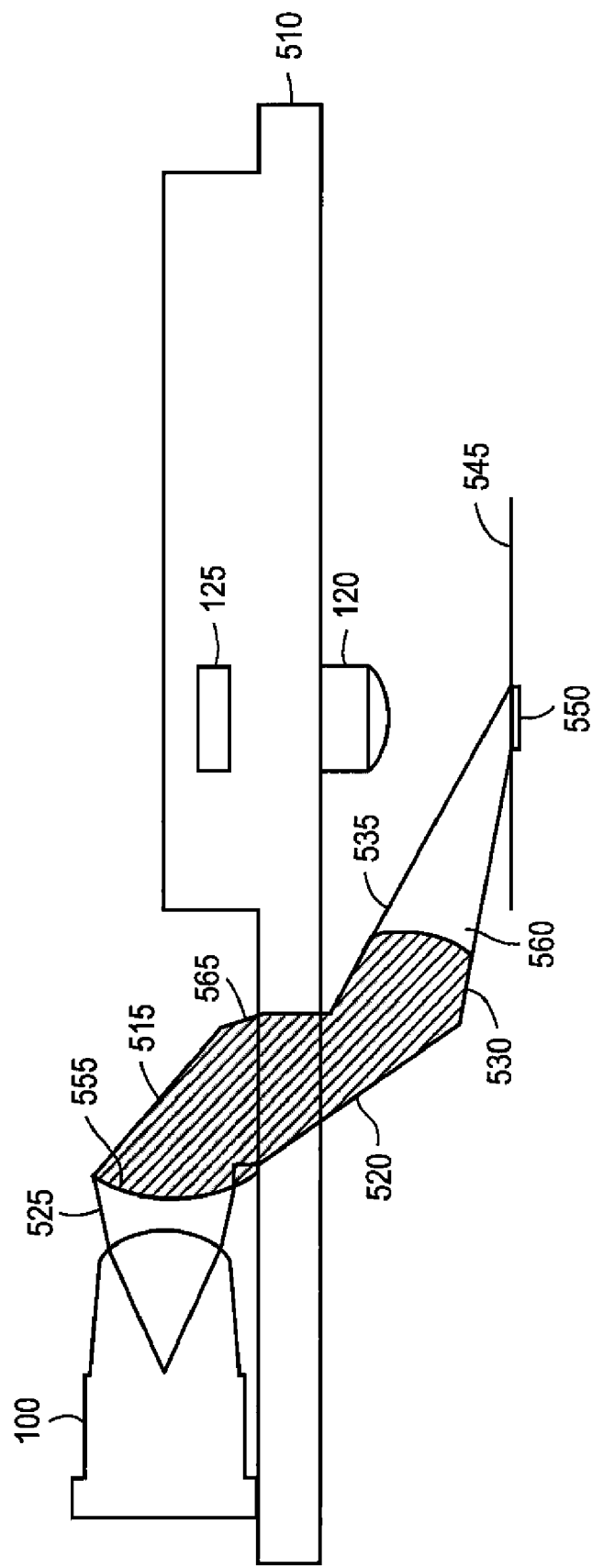
FIG. 5 is an illustration of a side view of one embodiment of the present invention that includes a conical light pipe with two truncating planes and a curvatured entrance surface or exit surface.

Now referring to FIG. 5, there is shown a side view of one embodiment of the present invention including a twice-truncated conical light pipe with a curvatured entrance and exit surface. The conical light pipe can be a circular cone or another shape cone, for example, a rectangular cone. The light pipe may comprise multiple sections. In one embodiment, the sections are not the same shape. For example, one section can be a circular cone shape and another section can be a rectangular cone shape. FIG. 5 shows a horizontal light source 100, a PCB 510, a curvatured entrance surface 555, a sensor 125, reflective surfaces 515 and 520, a curvatured exit surface 560, a target area (or a concentration point) 550 on a table surface 545, and an imaging lens 120. In the embodiment shown in FIG. 5, the light source 100 is used to emit light. In one embodiment, the light source 100 is an LED. The light source 100 can be parallel to the PCB 510. The light emitted from the light source forms a beam 525. The light beam 535 can be directed towards the target area 550 on a highly oblique angle using the reflective surfaces 515 and 520. The light diffused from the imaged area 550 is captured by the imaging lens 120 to form an image of the target area on the sensor 125.

In one embodiment, the light source 100 of the present invention can be a light emitting diode (LED) emitting at approximately 630 nm. In another embodiment, the light source 100 can be any other light source at any wavelength in the visible spectrum or near the infrared spectrum. The lens shown in FIGS. 4–6 can be made of many materials including any optical polymer or glass. Some examples of materials that can be used for the lens are polycarbonate, polystyrene, acrylic, polymethylmethacrylate, or another optical plastic. In all embodiments, any material can be used such that the desired result of a light pipe satisfying the TIR condition is met.

In the embodiment shown, the light is gathered by the entrance surface 555. The surfaces and truncation planes between the light source 100 and the exit surface 560 forms a conical light pipe with the curvatured entrance surface 555 and exit surface 560. The exit surface 560 can be toroidal, meaning the exit surface 560 may have two different radii of curvature in a vertical plane than in a horizontal plane. The truncation planes 515 and 520 can form a truncated cone. The light beam diameter at the entrance surface 555 is larger than the light beam diameter at the exit surface 560.

Figure 6:
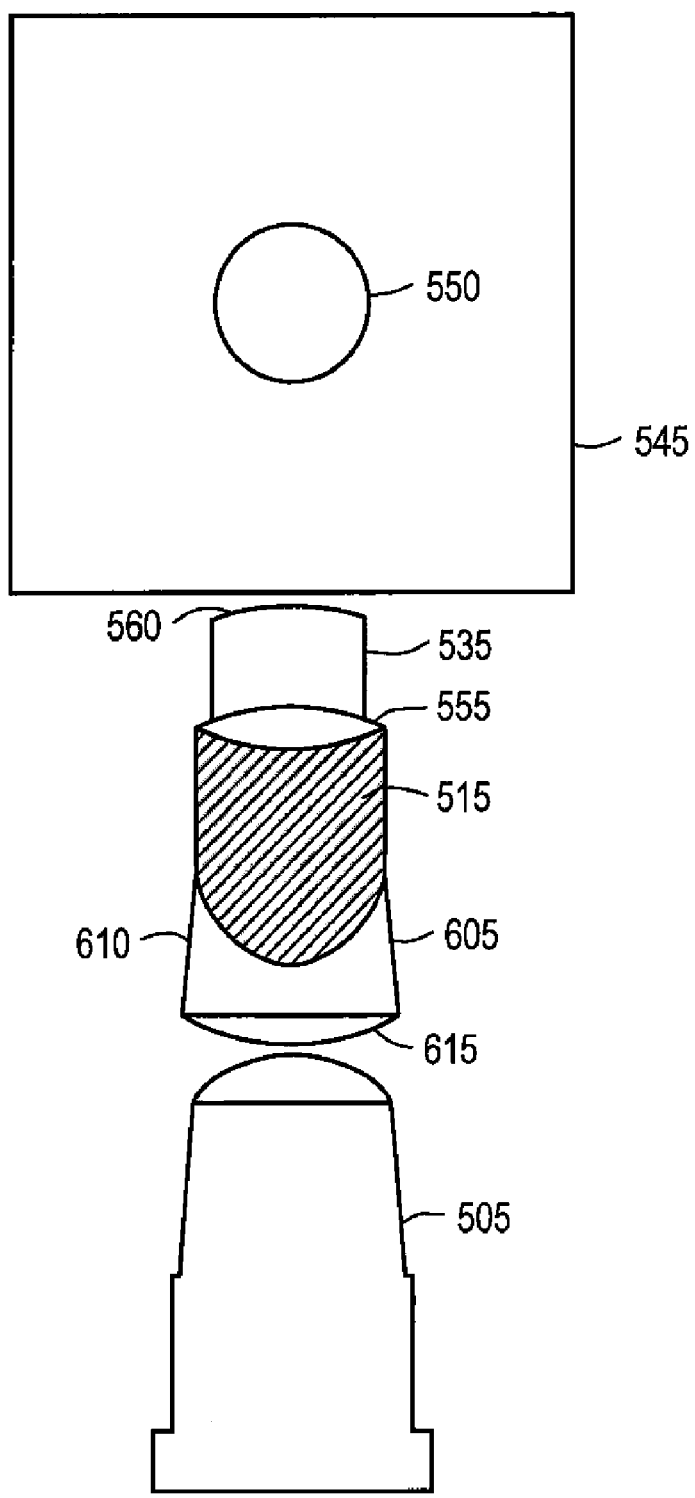
FIG. 6 is an illustration of a top view of one embodiment of the present invention that includes a conical light pipe with two truncating planes and a curvatured entrance surface or exit surface.

Now referring to FIG. 6, the conical light pipe with a curvatured entrance surface 555 and exit surface 560 is shown from a top view. Similarly to FIG. 5, a light source 100 is used to illuminate a surface 545 such as a table surface. The light is focused on the target area 550 on the surface 545. Again, similar to FIG. 5, the reflecting surfaces 515 and 520 form the twice-truncated conic light pipe. In one embodiment, the exit surface 560 can be a toroidal exit surface.

From the above description, it will be apparent that the invention disclosed herein provides a novel and advantageous system and method for illumination in an optical device. The foregoing discussion discloses and describes merely exemplary methods and embodiments of the present invention. As will be understood by those familiar with the art, the invention may be embodied in other specific forms without departing from the spirit or essential characteristics thereof. For example, the invention may be applied to other domains and environments, and may be employed in connection with additional applications where optical displacement or movement detection is desirable. Accordingly, the disclosure of the present invention is intended to be illustrative, but not limiting, of the scope of the invention, which is set forth in the following claims.

We claim:

1. An optical system within a computer mouse for illuminating a target surface, the optical system comprising:
   a light source, positioned at a first angle relative to a circuit board, the light source configured for emitting light to illuminate the target surface, the first angle being non-perpendicular to the circuit board; and
   a lens having an entrance surface and an exit surface, the entrance surface positioned to gather the light from the light source and the exit surface directing the light onto the target surface, the entrance surface structured with a curvature to refractively shape the gathered light and angled at a second angle different than the first angle to refract the gathered light towards the exit surface, the exit surface structured with a curvature to further refractively shape the gathered light and angled at a third angle different from the second angle to refract the gathered light to illuminate the target surface, the lens further configured to traverse light between the entrance surface and exit surface without total internal reflection,
   wherein an optical axis of the entrance surface is not parallel to an optical axis of the exit surface.

2. The system of claim 1, wherein the lens directs the light onto the target surface using a Fresnel lens.

3. The system of claim 1, wherein the lens directs the light onto the target surface using a diffractive optical element.

4. The system of claim 1, wherein the angle between the light source and the circuit board is approximately an angle between 10 degrees and 45 degrees.

5. The system of claim 1, wherein the light emitted from the light source flows through an opening in the circuit board.

6. The system of claim 1, wherein the light source protrudes through the circuit board.

7. The system of claim 1, wherein the lens is wedge-shaped.

8. The system of claim 1, the curvature of the entrance surface further comprises a toroidal surface for gathering light emitted from the light source.

9. The system of claim 1, wherein the curvature of the entrance surface comprises an aspherical surface.

10. The system of claim 1, wherein the curvature of the exit surface further comprises an aspherical surface for spreading light emitted from the light source onto the target surface.

11. The system of claim 10, wherein the curvature of the exit surface comprises a toroidal surface.

12. The system of claim 1, wherein the system is for use in an optical mouse.

13. The system of claim 1, wherein the system is for use in an optical trackball.

14. The system of claim 1, wherein the light source is a light emitting diode.

15. The system of claim 1, wherein the lens is made from glass.

16. The system of claim 1, wherein the lens is made from an optical plastic.

17. A method for illuminating a target surface using an illumination system in a computer pointing device, the method comprising:
   emitting light from a light source positioned at a first angle relative to a circuit board, the first angle being non-perpendicular to the circuit board;
   shaping refractively the emitted light gathered at an entrance surface of a lens, the entrance surface having a curvature for refracting the emitted light; and refracting the gathered light at a third angle through an exit surface of the lens, the exit surface having a curvature for further shaping refractively the gathered light, to illuminate the target surface with the light refracted from the exit surface, the light traversing between the entrance surface and exit surface without total internal reflection.

18. The method of claim 17, wherein the first angle relative to the surface is approximately between 10 degrees and 45 degrees.

19. An illumination system in a computer pointing device for illuminating an area of a surface, the illumination system comprising:

a means for emitting light, the means for emitting light structured at a first angle relative to a printed circuit board, the first angle being non-perpendicular to the circuit board; and a means for refractively shaping the emitted light gathered from the light source at an entrance surface of a directing means, the entrance surface having a curvature for refracting the gathered light, the means for refractively shaping the gathered light including a third angle through an exit surface, the exit surface having a curvature for refractively shaping further the gathered light, to illuminate the area of the target surface with the light refracted from the exit surface, the means for refractively shaping further configured to traverse light between the entrance surface and exit surface without total internal reflection.

20. The system of claim 19, wherein the means for emitting light is a light emitting diode.

21. The system of claim 19, wherein the means for emitting light is tilted at an angle of approximately 10 degrees to 45 degrees.

22. The system of claim 19, wherein the means for gathering the emitted light is a lens positioned to gather the light from the light emitting means.

23. The system of claim 19, wherein the computer pointing device comprises an optical mouse.

* * * * *